May 7, 1963 L. BALAMUTH ET AL 3,088,343
ULTRASONIC SEAM WELDING APPARATUS
Filed April 28, 1961 3 Sheets-Sheet 1

INVENTORS:
LEWIS BALAMUTH & ARTHUR KURIS
ATTORNEY.

INVENTORS:
LEWIS BALAMUTH & ARTHUR KURIS

ATTORNEY.

INVENTORS:
LEWIS BALAMUTH & ARTHUR KURIS

ATTORNEY.

_United States Patent Office_

3,088,343
Patented May 7, 1963

3,088,343
ULTRASONIC SEAM WELDING APPARATUS
Lewis Balamuth, New York, and Arthur Kuris, Riverdale, Bronx, N.Y., assignors to Cavitron Ultrasonics Inc., Long Island City, N.Y., a corporation of New York
Filed Apr. 28, 1961, Ser. No. 106,323
23 Claims. (Cl. 78—82)

This invention relates generally to ultrasonic welding, and more particularly is directed to improvements in apparatus for effecting the ultrasonic seam welding of metal sheets or webs.

Ultrasonic welding of metals generally is known and is essentially a solid state bonding process carried out at ambient temperature, without the aid of solders or fluxes. In existing ultrasonic welding devices, the metals to be joined are placed between two welding tips or sonotrodes, representing a driving sonotrode and a reflecting sonotrode or acoustically lead base, respectively, and are clamped under a static pressure while ultrasonic energy is introduced through the driving sonotrode for a relatively short interval. This arrangement introduces elastic vibratory energy into the joint area with the result that a weld or bond is there formed between the metals. In those existing devices adapted for ultrasonic seam welding, the driving sonotrode is formed with a welding tip of circular cross-section and is rotatably mounted for rolling contact with the metal sheets or webs to be welded to each other, while the reflecting sonotrode is in the form of a back-up or support roller disposed adjacent the circular tip of the driving sonotrode, and the metal sheets or webs to be welded to each other are fed in the direction of the desired seam between the simultaneously rotated welding tip and back-up roller.

The above described existing device for ultrasonic seam welding has several disadvantages. The rotatable mounting of the driving sonotrode results in undesirable complexity of the structure of the apparatus. Further, the circular tip of the driving sonotrode and the back-up roller forming the reflecting sonotrode effect rolling contact with the sheets or webs to be welded together only at the point of tangency therebetween and for a period of time determined by the speed at which the sheets or webs are fed between the driving and reflecting sonotrodes. If elastic vibratory energy is to be introduced into the joint area for a period of time sufficient to produce a strong weld or bond, then the rate of displacement or feed of the sheets or webs is correspondingly limited and high speed seam welding is precluded.

The existing apparatus is also limited to use in connection with work pieces that can be conveniently fed past the stationary locations of the rotated welding tip and back-up roller.

It is an object of the invention to provide ultrasonic seam welding apparatus avoiding the foregoing disadvantages of the existing apparatus.

In the described existing seam welding devices the circular welding tip having rolling contact with one of the metal sheets or webs to be welded together was apparently adopted through the mistaken notion that the static clamping pressure exerted on the sheets or webs between the driving and reflecting sonotrodes would result in a frictional resistance to movement of the sheets or webs relative to the sonotrodes in the direction of the desired seam unless such sonotrodes were in the form of a rotatable circular welding tip and a rotatable back-up roller, respectively, having rolling contact with the sheets or webs, as described above. However, it has now been found that the vibrations of the welding tip, even in a plane perpendicular to the static force or pressure as required for ultrasonic welding, act to substantially minimize the frictional resistance by the welding tip to movement of the engaged sheet or web in the direction of the desired seam.

Accordingly, it is an important aspect of the present invention that the sheets or webs to be seam welded are subjected to static pressure or clamped together between a stationary welding element and one or more movable back-up members, while the welding element is vibrated at least in a plane perpendicular to the static or clamping pressure and relative movement or displacement is effected in the direction of the desired seam weld at least as between the webs or sheets to be welded and the back-up member or members.

In some embodiments of the invention, the sheets or webs to be welded together are fed between the stationary, vibrated welding element and the back-up member or members, each of which is maintained in a fixed location and has a movable surface contacting the adjacent sheet or web, with the anti-friction effect of the vibrations of the welding element being relied upon to permit the free movement of the clamped sheets or webs relative to the welding element in the direction of the desired seam weld.

Since the welding element need not be rotatable and need not have a surface with a circular cross-section in rolling contact with the engaged sheet or web, as in the existing seam welding apparatus, the operative surface of the welding element in the apparatus embodying the present invention may be of substantial length in the direction of the seam weld, while the sheets or webs to be welded together are clamped between such surface and the back-up member or members either simultaneously at a number of locations along the desired seam weld or along a substantial length of the latter, thereby making possible a substantially increased rate of feed of the sheets or webs through thte seam welding apparatus while ensuring that each point along the desired seam weld will have elastic vibratory energy introduced therein for a period of time sufficient to provide a satisfactory bond or weld.

In accordance with another aspect of the invention, the movement of the engaged sheet or web over the operative surface of the stationary welding element is facilitated by constructing the latter so as to obtain vibratory movement at its operative surface both in the plane of that surface, that is, perpendicular to the static or clamping pressure, and also perpendicular to the plane of the operative surface or in the direction of the clamping pressure so that the latter component of the vibratory movement further reduces the frictional resistance of the welding element to movement of the clamped sheets or webs in the direction of the desired weld seam.

In other embodiments of the invention employing a welding element having an operative surface of substantial length in the direction of the weld seam, the sheets or webs to be welded together are immobile during the welding operation, and hence easily and accurately located relative to each other, and the sheets or webs are subjected to clamping pressure between the operative surface of the welding element and at least one back-up roller which is bodily displaced or translated along the length of the operative surface of the welding element while in rolling contact with the sheets or webs clamped therebetween so that welding is effected progressively along the desired seam. The roller or rollers constituting the back-up member or members may be translated along a straight path, in the case of a straight weld seam, or along an irregular path corresponding to the path of the desired weld seam.

The above, and other objects, features and advantages of the invention, will be apparent in the following detailed description of illustrative embodiments thereof which is to be read in connection with the accompanying drawings forming a part hereof, and wherein.

Figure 1:
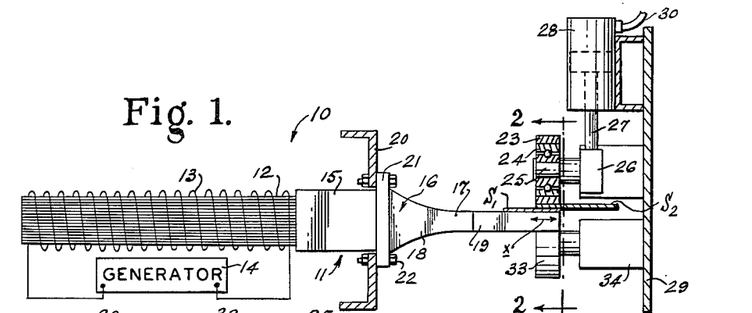
FIG. 1 is an end elevational view, partly broken away and in section, of an ultrasonic seam welding apparatus embodying this invention.
Figure 2:
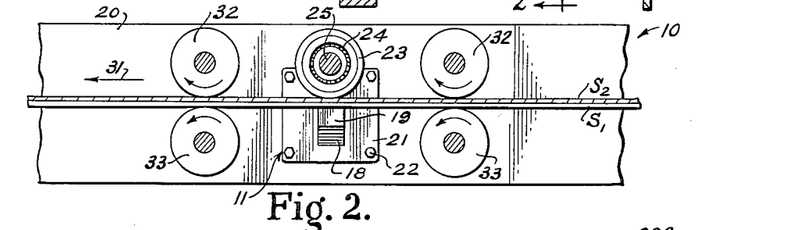
FIG. 2 is a vertical sectional view taken along the line 2—2 of FIG. 1.

Referring to the drawings in detail and initially to FIGS. 1 and 2 thereof, it will be seen that an ultrasonic seam welding apparatus embodying the present invention, and there generally identified by the reference numeral 10, comprises at least one mechanical vibrator 11 that includes a transducer 12. The transducer may be any one of a number of electro-mechanical types, such as, electro-dynamic, piezo-electric or magnetostrictive, however, for the operating range of frequencies most desirable for ultrasonic welding, transducer 12 is preferably of the magnetostrictive type. The magnetostrictive transducer 12 is preferably formed of a metal, such as, perma-nickel, nickel, permendur, or other metals which have high tensile strength and are highly magnetostrictive in character, so that the transducer will vibrate to a maximum degree when subjected to the influence of a biased alternating electromagnetic field established by biased alternating current supplied to a surrounding driving coil or winding 13 from a suitable oscillation generator 14.

In the embodiment illustrated in FIG. 1, the transducer 12 is made up of a stack of strips of the selected metal secured together at one end, while the other end of the transducer is rigidly fixed, as by brazing solder, to the head 15 of an acoustic impedance transformer which is generally identified by the reference numeral 16 and which also forms part of the mechanical vibrator 11.

The stack of metal strips forming the illustrated transducer 12 may be replaced by a bundle of metal wires or rods, preferably of rectangular cross-section so that they can be compactly assembled together, a roll of metal foil, or a longitudinally split metal tube. In each case, the length of the magnetostrictive transducer 12 is selected so that it will be a whole multiple of the half-wavelength of the compressive waves established in the transducer at the frequency of the alternating electromagnetic field produced by the biased alternating current supplied to the driving coil 13.

The acoustic impedance transformer or connecting body 16 may be made of a strong metal, such as, steel, Monel metal, titanium, Phosphor-bronze, brass or beryllium copper, and further includes a stem 17 integrally joined to the head 15 by a tapered neck 18 and either integral with, or rigidly joined to an extension 19 which forms the driving sonotrode or welding element of the apparatus 10. The transformer or connecting body 16 and the welding element 19 are longitudinally dimensioned so that a loop of longitudinal motion occurs at the free end portion of welding element 19 when vibrations or compressive waves are established in the transducer 12 and transmitted from the latter to the welding element by way of transformer 16. Further, the illustrated configuration of transformer 16 is effective to amplify or increase the amplitude of the vibrations during transmission of the latter from transducer 12 to welding element 19.

The mechanical vibrator 11 is non-rotatably mounted on a frame 20, for example, by a flange 21 extending from transformer 16 at a node of motion of the latter and being secured, as by bolts 22, to frame 20. The mechanical vibrator 11 is preferably disposed with its longitudinal axis extending horizontally so that the vibrations $x$ at the free end portion of welding element 19 are disposed in a horizontal plane.

The metal sheets or webs $S_1$ and $S_2$ to be seam welded together are subjected to a static pressure or vertically clamped between the upper surface of welding element 19 and at least one back-up member which, in the apparatus 10, is in the form of a single roller 23 mounted rotatably, by a ball bearing or other anti-friction bearing 24, on an axle 25 for rotation about a horizontal axis extending parallel to the longitudinal axis of mechanical vibrator 11. In order to apply the necessary static or clamping pressure, axle 25 extends from a head 26 on a rod 27 secured to a piston movable within a cylinder 28 mounted on a suitable frame structure 29 and to which fluid under pressure, for example, compressed air, is supplied through a conduit 30 for urging roller 23 downwardly toward welding element 19.

The static or clamping pressure or force exerted on the sheets or webs $S_1$ and $S_2$ between roller 23 and welding element 19 should be sufficient to hold together the sheets or webs in the joint area during the introduction of elastic vibratory energy, and may be in the range between approximately 1 and 500 pounds. The frequency of the vibrations $x$ at the free end portion of welding element 19 may be in the range from 1 to 100 kilocycles per second, and preferably in the range from 10 to 80 kilocycles per second, while the amplitude of the vibrations is selected within the range from approximately .001 to .025 inch so as to ensure the introduction of vibratory energy sufficient to form a secure weld or bond.

It has been found that, by reason of the vibrations $x$ in the horizontal plane, that is, in a plane perpendicular to the direction of the static or clamping pressure or force, the frictional resistance of the welding element 19 to movement of the engaged sheet or web $S_1$ is very substantially reduced. A possible explanation of this observed phenomenon is that the extremely high acceleration of the top surface of welding element 19 resulting from the vibrations $x$ causes only a relatively small sliding friction to be present between the engaged sheet or web $S_1$ and the welding element. Thus, even though the welding element 19 is stationary and may have a flat upper or operative surface, as when transformer 16 and welding element 19 are formed with square or rectangular cross-sections, as illustrated in FIG. 2, the sheets or webs $S_1$ and $S_2$ are nevertheless easily displaceable between welding element and roller 23, for example, in the direction of the arrow 31 on FIG. 2, thereby to successively subject the overlapped edge portions of the sheets or webs to the welding action between the back-up roller and the welding element and thus provide a continuous weld seam. The displacement of the sheets or webs $S_1$ and $S_2$ between welding element 19 and roller 23 can be conveniently effected by pairs of upper and lower feed rollers 32 and 33 respectively engageable, from above and below, with the overlapped edge portions of the sheets or webs at the opposite sides of the location of welding element 19 and roller 23, with at least the pair of rollers 32 and 33 located after the welding element, considered in the direction of movement of the sheets or webs, being rotatably driven, for example, by a motor 34 also mounted on the frame structure 29.

Figure 3:
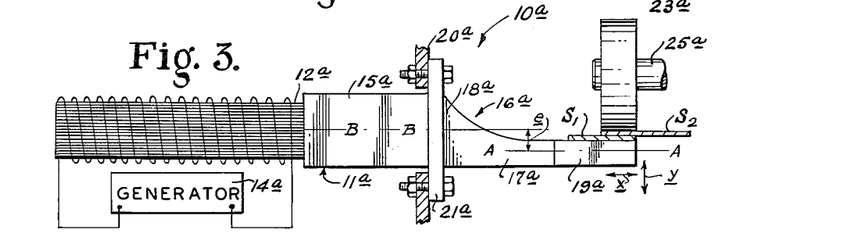
FIG. 3 is a view similar to that of FIG. 1, but showing an ultrasonic seam welding apparatus having a modified form of welding element.

In the above described apparatus 10, the transformer 16 and welding element 19 are symmetrical about the longitudinal axis of mechanical vibrator 11 so that the compressive waves established in transducer 12 produce vibrations $x$ in the end portion of welding element 19 only in the direction of the longitudinal axis. However, as shown in FIG. 3, an ultrasonic seam welding apparatus 10a which is generally similar to the apparatus 10 and has its parts identified by the same reference numerals employed in connection with the corresponding parts of apparatus 10, but with the letter "a" appended thereto, is provided with a connecting body or acoustic impedance transformer 16a in which the longitudinal axis A—A of the stem 17a, and hence of the welding element 19a extending therefrom, is offset by a distance $e$ from the longitudinal axis B—B of the head 15a and the transducer 12a. By reason of the offset or asymmetrical character of welding element 19a with respect to the longitudinal axis B—B, the longitudinal vibrations received by the transformer 16a from transducer 12a are translated, at the free end portion of welding element 19a, into vibrations $x$ in a horizontal plane perpendicular to the direction of the static or clamping pressure, and vertical vibrations indicated by the arrows $y$, that is, vibrations perpendicular to the plane of the contacting surfaces of welding element 19a and the engaged sheet or web $S_1$. Such vibrations $y$ occur at the same frequency as the vibration $x$ and may have an amplitude in the same range so as to provide high velocity-amplitudes or accelerations at the operative surface of welding element 19a, for example, of the order of 1000 $g$, and such high velocity-amplitudes or accelerations ensure that the confronting surfaces of the welding element and sheet or web $S_1$ are separated during a portion of each cycle, notwithstanding the static or clamping pressure, thereby to further reduce the frictional resistance by the welding element to displacement of the overlapped edge portions of sheets or webs $S_1$ and $S_2$ between the welding element and the back-up roller 23a in the direction of the desired weld seam.

Figures 4, 6:
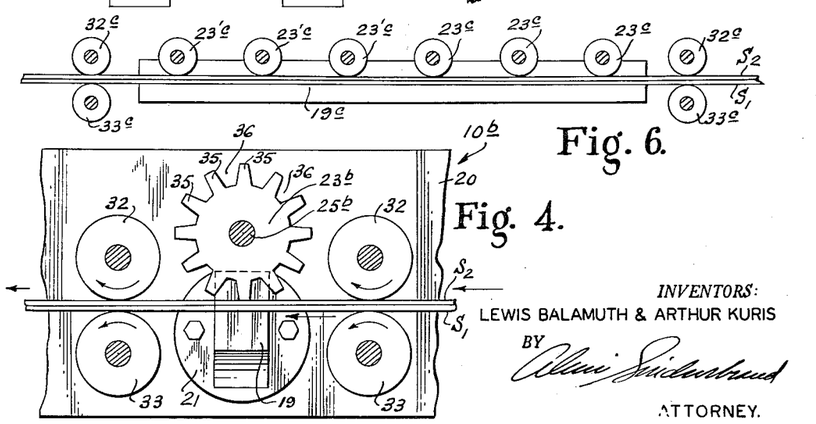
FIG. 4 is a sectional view similar to that of FIG. 2, but showing an ultrasonic seam welding apparatus having a modified form of back-up roller for producing tack welds at spaced apart locations along the seam.
FIG. 6 is a longitudinal sectional view taken along the line 6—6 of FIG. 5.

In each previously described ultrasonic seam welding apparatus 10 or 10a, the back-up roller 23 or 23a is formed with a smooth periphery so that the static or clamping pressure is continuously applied to the overlapped edge portions of the sheets or webs $S_1$ and $S_2$ as the latter are fed between the welding element and the back-up roller, thereby to provide a continuous seam weld. However, as shown in FIG. 4, an ultrasonic seam welding apparatus 10b which is generally similar to the previously described apparatus 10, and which has its several parts identified by the same reference numerals as have been used in describing the corresponding parts of the apparatus 10, is provided with a back-up roller 23b formed with a periphery having radially raised and depressed portions, so that the clamping pressure is exerted only at the areas of the sheets or webs corresponding to the raised portions. For example, the roller 23b may have a toothed periphery as shown, so as to define radially raised lands 35 which are circumferentially spaced apart by intervening, radially opening cutouts or notches 36. The back-up roller 23b may be fixed on its shaft or axle 25b and the latter is preferably rotated, as by a motor or the like (not shown) so as to have the same peripheral speed as the feed rollers 32 and 33 by which the sheets or webs $S_1$ and $S_2$ are advanced between the vibrated welding element 19 and the back-up roller 23b. Thus, the periphery of back-up roller 23b cooperates with the stationary, vibrated welding element 19 to exert the static or clamping pressure necessary for producing the welding action only where a raised portion or tooth 35 of the back-up roller engages the upper sheet or web $S_2$. Accordingly, the apparatus 10b is effective to produce a seam weld made up of a succession of tack welds which are spaced apart by a distance equal to the circumferential distance between adjacent lands 35 on back-up roller 23b. Obviously the raised portions of the roller may have configurations other than that shown to produce correspondingly shaped seam welds.

Figure 5:
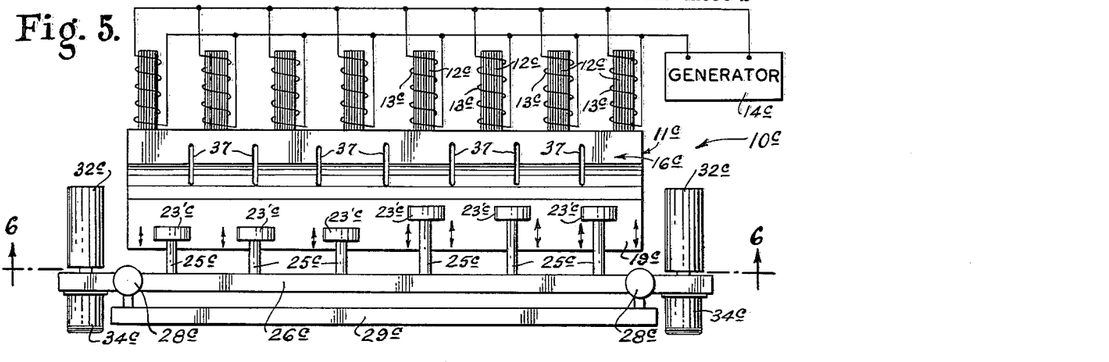
FIG. 5 is a schematic top plan view of an ultrasonic seam welding apparatus constructed in accordance with another embodiment of the present invention.

Since the vibrations at the operative surface of the welding element are effective to substantially reduce the frictional resistance to movement of the engaged sheet or web over such operative surface, particularly when the vibrations include a component perpendicular to the operative surface of the welding element, as in the embodiment of FIG. 3, the welding element of an ultrasonic seam welding apparatus embodying the present invention may be provided with a very substantial length in the direction of the desired seam weld so as to introduce the elastic vibratory energy into the metal sheets or webs either simultaneously at a number of locations along the desired seam weld or continuously along a substantial length of the seam weld. Such introduction of vibratory energy into the sheets or webs simultaneously at a number of locations along the desired seam permits an increase in the speed with which the sheets or webs to be welded are fed through the apparatus while ensuring the introduction of adequate elastic vibratory energy at each point along the weld for obtaining a strong weld or bond. For example, as shown in FIGS. 5 and 6, an ultrasonic seam welding apparatus 10c embodying this invention may have a mechanical vibrator 11c including a connecting body or transformer 16c and an extension forming a welding element 19c which, in cross-section or end view, have configurations similar to those illustrated in FIGS. 1 or 2, but which are of substantial length in the direction of the seam weld by which the sheets or webs $S_1$ and $S_2$ are to be secured together.

Since it is desirable to provide in-phase vibrations of uniform amplitude over the entire area of the upper or operative surface of welding element 19c, and since there is a limiting dimension for any particular material of the connecting body or transformer 16c beyond which a plane wave front cannot be transmitted therethrough, the vibrations are introduced into the connecting body or transformer 16c by a number of transducers 12c spaced apart along the longitudinal edge of the latter remote from welding element 19c and each provided with a driving coil 13c. As described in detail in the co-pending application for United States Letters Patent, Serial No. 35,057, filed June 9, 1960, by Claus Kleesattel, Lewis Balamuth and Arthur Kuris, the portions of the connecting body or transformer 16c which are excited by vibrations introduced therein from the related transducers 12c have Posson couplings therebetween at the nodal plane or planes, and these couplings produce complex interactions between the vibrations in the several portions of the connecting body. Thus, as disclosed in the above identified application, in-phase vibrations of uniform amplitude are obtained over the entire operative area of welding element 19c by forming the connecting body or transformer 16c with slots 37 extending therethrough between the locations of the transducers 12c in planes which are perpendicular to the direction of the large dimension or length of the connecting body and welding element. The slots 37 break the Poisson couplings between the portions of the connecting body 16c receiving vibratory energy from the respective transducers 12c, whereby the separated portions can act as individual connecting bodies or transformers producing a plane wave front at the welding element 19c.

Since the welding element 19c presents an upper or operative surface of substantial length along which the overlapped edge portions of sheets $S_1$ and $S_2$ move continuously during the seam welding operation, a number of back-up rollers 23c and 23'c can be arranged in succession above welding element 19c for rotation about parallel axes 25c extending from a beam or support 26c. The beam or support 26c is urged downwardly by fluid pressure operated cylinders 28c so that the sheets or webs to be welded are subjected to a static or clamping pressure simultaneously at a number of locations along the desired seam weld or welds between the rollers 23c and 23'c and the top surface of welding element 19c. All of the rollers may be arranged in a row or line or, as shown in FIG. 5, the rollers 23c may be arranged in one aligned group or row while the rollers 23'c are arranged in another aligned group or row offset with respect to the first mentioned group so that, as the sheets or webs are fed, rollers 23c and rollers 23'c exert static or clamping pressures along laterally spaced apart lines to produce correspondingly spaced apart parallel seam welds between the sheets or webs $S_1$ and $S_2$.

Since each point along each of the seam welds passes successively between a number of the back-up rollers 23c or 23'c and the vibrated welding element 19c, it is apparent that the time during which each point must be disposed between each roller and the welding element to produce an adequate weld or bond is substantially reduced thereby permitting a considerable increase in the speed at which the sheets or webs $S_1$ and $S_2$ are fed over welding element 19c by the feed rollers 32c and 33c which may be driven by motors 34c.

Figure 7:
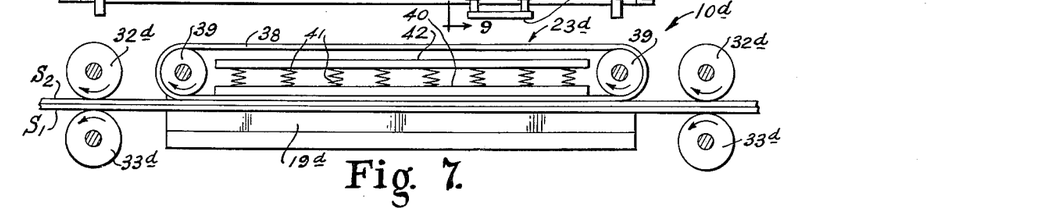
FIG. 7 is a view similar to that of FIG. 6, but showing a modification of the back-up means cooperating with the welding element to exert a clamping pressure on the sheets or webs to be welded together therebetween.

In the previously described embodiments of the invention, each back-up member cooperating with the vibrated, stationary welding element to provide the necessary static or clamping pressure has been in the form of a back-up roller having rolling contact with the engaged sheet or web to be welded only at a point or line of tangency. However, as shown in FIG. 7, an ultrasonic seam welding apparatus 10d embodying the present invention, and which is generally similar to the apparatus 10c of FIGS. 5 and 6, may have the back-up rollers 23c and 23'c of the latter replaced by a back-up member 23d in the form of an endless belt or chain 38 passing around rotatable pulleys 39 disposed above the opposite ends of the elongated welding element 19d and disposed so that the lower run of belt or chain 38 continuously bears downwardly upon the overlapped edge portions of the sheets or webs $S_1$ and $S_2$ as the latter are continuously fed along the operative surface of welding element 19d by the driven feed rollers 32d and 33d. In order to ensure that a uniform downward clamping pressure is exerted by the lower run of belt or chain 38, an elongated guide member 40 is disposed above such lower run and urged downwardly against the latter by compression springs 41 which abut against a frame member 42.

From the above, it will be apparent that, in the seam welding apparatus 10d, the overlapped edge portions of the sheets or webs are continuously subjected to a static or clamping pressure during the entire travel thereof between the lower run of belt or chain 38 and the upper operative surface of welding element 19d so that the welding action occurs continuously from one end to the other of the welding element and a corresponding increase in the feeding speed of the sheets or webs may be tolerated without affecting the quality of the bond or weld.

Figure 8:
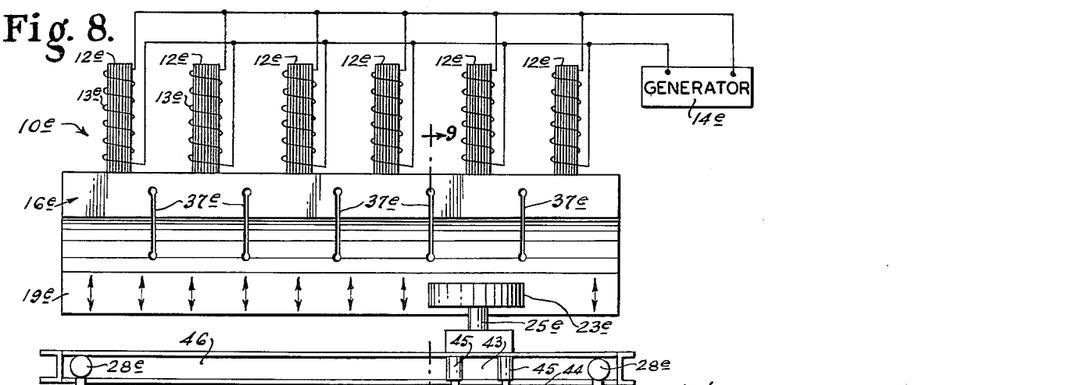
FIG. 8 is a schematic top plan view similar to that of FIG. 5, but showing an ultrasonic seam welding apparatus in accordance with still another embodiment of the present invention.
Figure 9:
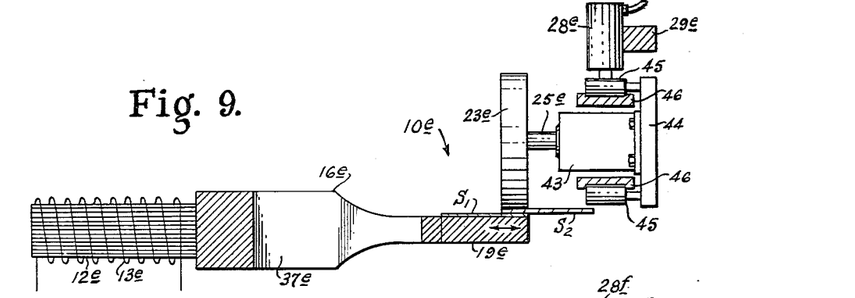
FIG. 9 is an enlarged sectional view taken along the line 9—9 of FIG. 8.

In each of the previously described embodiments of the invention, the sheets or webs to be welded together have been fed between the stationary, vibrated welding element and one or more back-up members each held in a fixed location above the welding element and having a sheet or web contacting surface which moves with the latter while being pressed towards the operative surface of the welding element to cooperate with the latter in exerting the necessary static or clamping pressure. However, in some instances it is desirable to effect the ultrasonic seam welding of the overlapped edge portions of metal sheets or webs while the latter are at rest, for example, when the sheets to be welded are heavy or brittle and not easily conveyed, or when it is desired to facilitate the accurate location of the sheets or webs relative to each other. The ultrasonic seam welding apparatus 10e of FIGS. 8 and 9 is capable of functioning in this manner and generally comprises an elongated connecting body 16e similar to the connecting body 16c of the apparatus 10c for transmitting in-phase uniform vibrations from a number of transducers 12e, each having a driving coil 13e associated therewith, to an elongated welding element 19e. In the apparatus 10e, the sheets or webs $S_1$ and $S_2$ are suitably held in fixed position with their edges in overlapped relationship on the upper operative surface of welding element 19e, while a back-up roller 23e pressed downwardly toward welding element 19e is rolled along the latter and thereby cooperates with the welding element in successively exerting the desired clamping or static pressure at all points along the desired weld seam defined by the path of travel of the roller 23e.

In order to effect the desired rolling movement of roller 23e along the top of welding element 19e, the roller 23e may be secured on the shaft 25e of a reversible electric motor 43 mounted on a carriage 44 having rollers 45 which engage guide rails 46 making up a vertically movable frame which is urged downwardly by fluid pressure operated cylinders 28e mounted on a fixed frame member 29e. Thus, motor 43 turns roller 23e so that the latter rolls along the overlapped edge portions of the sheets or webs on welding element 19e and is guided in such movement by the cooperative engagement of the rollers 45 of carriage 44 with the guide rails 46 of the downwardly pressed frame.

Figure 10:
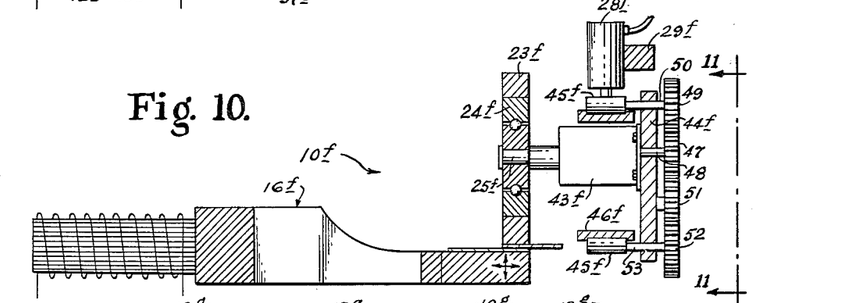
FIG. 10 is a sectional view similar to that of FIG. 9, but illustrating a modification of the ultrasonic seam welding apparatus of FIGS. 8 and 9.
Figure 11:
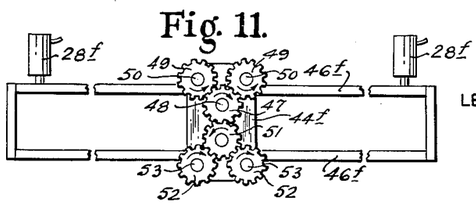
FIG. 11 is an elevational view of the apparatus of FIG. 10 as viewed in the direction of the arrows 11—11 on the latter.

Although the apparatus 10e causes rolling of the back-up roller 23e along the welding element by rotatably driving such back-up roller, reference to the generally similar apparatus 10f of FIGS. 10 and 11 will show that the back-up roller 23f may be merely rotatably on a bearing 24f carried by a shaft or axle 25f fixed to the housing of motor 43f, while the guide rollers 45f engaging the guide rails 46f are rotatably driven by a suitable transmission from the motor 43f so as to advance the carriage 44f along the guide rails, and thereby cause translation of the roller 23f which rolls on the overlapped edge portions of the sheets or webs.

As shown particularly in FIG. 11, a suitable gear transmission for effecting rotation, in opposite directions, of the upper and lower guide rollers 45f may include a pinion 47 fixed on the shaft 48 of motor 43f and meshing both with spur gears 49 on shafts 50 carrying the upper guide rollers 45f, and with an idler gear 51 disposed below pinion 47 and meshing, in turn, with spur gears 52 on shafts 53 carrying the lower guide rollers 45f. Thus, as is apparent in FIG. 11, the lower guide rollers are rotated in the same direction as the motor shaft, while the upper guide rollers are rotated in the opposite direction to drive the carriage 44f either toward the left or the right depending upon the direction of rotation of the reversible electric motor 43f.

Figure 12:
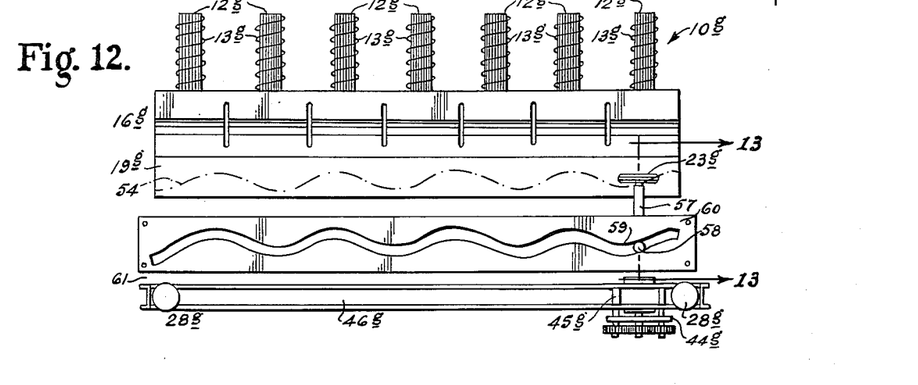
FIG. 12 is a top plan view similar to that of FIG. 8, but illustrating a further embodiment of the invention.
Figure 13:
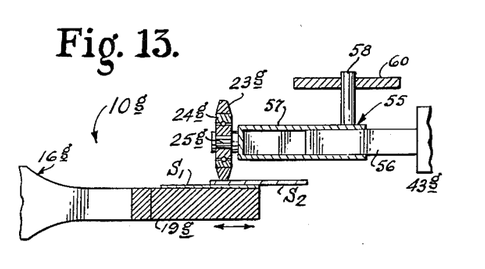
FIG. 13 is an enlarged sectional view taken along the line 13—13 of FIG. 12.

Although each apparatus 10e or 10f has only a single back-up roller 23e or 23f, it is understood that the movable carriage may carry two or more of such back-up rollers, for simultaneously exerting the necessary clamping pressure at locations along the desired weld seam. Further, although the rollers 23e and 23f of the ultrasonic seam welding apparatuses described above with reference to FIGS. 8 and 9 and FIGS. 10 and 11, respectively, follow straight paths during movement along the elongated welding element, and thus produce straight seam welds, FIGS. 12 and 13 illustrate an ultrasonic seam welding apparatus 10g which is generally the same as the apparatus 10f, but wherein the back-up roller 23g is made to follow an irregular path indicated by the broken line 54 (FIG. 12) and thereby forms a weld seam of similar configuration. In apparatus 10g, the roller 23g is rotatably mounted, by a bearing 24g, on a shaft 25g which projects from an extensible support 55 carried by the housing of the motor 43g by which the rollers 45g of carriage 44g are driven along the guide rails 46g, as in the apparatus 10f. The extensible support 55 includes an inner elongated member 56 of non-circular cross-section projecting from the housing of motor 43g and slidably telescoping into an elongated hollow member 57 of similar non-circular cross-section from which the axle or shaft 25g extends. A follower pin 58 projects upwardly from the outer member 57 and is slidably received in a suitably shaped cam slot 59 (FIG. 12) which is formed in a template 60 secured, as by brackets 61, to the vertically movable frame made up of the guide rails 46g. Thus, as the carriage 44g is driven along the guide rails 46g to effect rolling of the back-up roller 23g along the elongated welding element 19g with the overlapped edge portions of the sheets or webs $S_1$ and $S_2$ clamped therebetween, the pin 58 and cam slot 59 cooperate to effect movement of the roller 23g parallel to its axis of rotation so that the roller follows a path which parallels the cam slot 59 to provide a similarly shaped seam weld.

From the above, it will be apparent that each ultrasonic seam welding apparatus embodying this invention employs a stationary, vibrated welding element which may have a flat operative surface for introducing elastic vibratory energy into the joint area between the overlapped edge portions of metal sheets or webs subjected to a static or clamping pressure between such operative surface of the welding element and one or more cooperating back-up members. Since the welding element is stationary, as distinguished from the rotatable welding elements of existing ultrasonic seam welding apparatus, substantial simplification results in the mounting of the vibrated welding element and its driving transducer, and further, such welding element can be provided with an operative surface which is elongated in the direction of the desired seam weld to permit either simultaneous welding at a number of locations along the desired seam or welding along a substantial length of the seam. Such simultaneous welding at several points, or along a substantial length of the seam, permits an increase in the speed at which the sheets or webs to be welded are fed through the welding apparatus. Alternatively, the sheets or webs to be welded together may be accurately located relative to each other in stationary positions, while one or more back-up members move along the elongated welding element to progressively exert the necessary static or clamping pressure for producing the ultrasonic weld.

Although illustrative embodiments of this invention have been described in detail herein with reference to the accompanying drawings, it is to be understood that the invention is not limited to those precise embodiments, and that various changes and modifications may be effected therein by one skilled in the art without departing from the scope or spirit of the invention, except as defined in the appended claims.

What is claimed is:

1. An ultrasonic seam welding apparatus comprising a mechanical vibrator including magnetostrictive transducer means in which high frequency compressive waves are generated and a welding element connected to said transducer means and having an operative surface at which said waves produce vibrations at least parallel to the plane of said operative surface, non-rotatable mounting means supporting said vibrator, back-up means having a surface which confronts said operative surface of the welding element and is movable relative to the latter generally in the longitudinal direction of the seam weld to be formed, means operative to displace said back-up means and welding element toward each other in the direction perpendicular to said operative surface to exert a clamping pressure on overlapped work pieces engaged between said surfaces of the welding element and back-up means, respectively, so that elastic vibratory energy is introduced in the region of said clamping pressure to there weld together the engaged work pieces, and means operative to effect relative displacement in the direction of the desired seam weld of at least said back-up means and the work pieces so that the latter are successively subjected to said clamping pressure and welded along the desired seam.

2. An ultrasonic seam welding apparatus comprising a mechanical vibrator including magnetostrictive transducer means in which high frequency compressive waves are generated and a welding element connected to said transducer means and having an operative surface at which said waves produce vibrations at least parallel to the plane of said operative surface, non-rotatable mounting means supporting said vibrator, back-up means defining a back-up surface which, at least in part, confronts said operative surface of the welding element and is there movable relative to the latter generally in the longitudinal direction of the seam weld to be formed, means operative to displace said back-up means and welding element toward each other in the direction perpendicular to said operative surface to exert a clamping pressure on overlapped work pieces engaged between said surfaces of the welding element and back-up means, respectively, so that elastic vibratory energy is introduced in the region of said clamping pressure to there weld together the engaged work pieces, and feeding means operative to advance the overlapped work pieces between said surfaces of the welding element and back-up means so that the overlapped work pieces are successively subjected to the clamping pressure and welded along the desired seam while said vibrations substantially minimize the frictional resistance of said welding element to the advancement of the work pieces by said feeding means.

3. An ultrasonic seam welding apparatus comprising a mechanical vibrator including magnetostrictive transducer means in which high frequency longitudinal compressive waves are generated and a welding element connected to said transducer means and being asymmetrical with respect to the longitudinal axis of said transducer means, said welding element having an operative surface at which said waves produce vibrations including components both parallel to the plane of said operative surface and perpendicular thereto, non-rotatable mounting means supporting said vibrator, back-up means having a surface which confronts said operative surface of the welding element and is movable relative to the latter generally in the longitudinal direction of the seam weld to be formed, means operative to displace said back-up means and welding element toward each other in the direction perpendicular to said operative surface to exert a clamping pressure on overlapped work pieces engaged between said surfaces of the welding element and back-up means, respectively, so that elastic vibratory energy is introduced in the region of said clamping pressure to there weld together the engaged work pieces, and means operative to effect relative displacement in the direction of the desired seam weld of at least said back-up means and the work pieces so that the latter are successively subjected to said clamping pressure and welded along the desired seam.

4. An ultrasonic seam welding apparatus comprising a mechanical vibrator including magnetostrictive transducer means in which high frequency longitudinal compressive waves are generated and a welding element connected to said transducer means and being asymmetrical with respect to the longitudinal axis of said transducer means, said welding element having an operative surface at which said waves produce vibrations including components both parallel to the plane of said operative surface and perpendicular thereto, non-rotatable mounting means supporting said vibrator, back-up means having a back-up surface which, at least in part, confronts said operative surface of the welding element and is there movable relative to the latter generally in the longitudinal direction of the seam weld to be formed, means operative to displace said back-up means and welding element toward each other in the direction perpendicular to said operative surface to exert a clamping pressure on overlapped work pieces engaged between said surfaces of the welding element and back-up means, respectively, so that elastic vibratory energy is introduced in the region of said clamping pressure to there weld together the engaged work pieces, and feeding means operative to advance the overlapped work pieces between said surfaces of the welding element and back-up means so that the overlapped work pieces are successively subjected to said clamping pressure and welded along the desired seam while said vibrations perpendicular to the operative surface of said welding element substantially minimize frictional resistance of the latter to the advancement of the work pieces by said feeding means.

5. An ultrasonic seam welding apparatus comprising a mechanical vibrator including magnetostrictive transducer means in which high frequency vibrations are generated and a welding element receiving said vibrations from said transducer means and having an operative surface of substantial length at which vibrations are produced at least parallel to the plane of said operative surface, non-rotatable mounting means supporting said vibrator, back-up means confronting said operative surface at least at a plurality of locations along the length of the latter and being movable relative to the welding element generally in the direction of the length of said operative surface, means operative to displace said back-up means and welding element toward each other to exert a clamping pressure, in the direction perpendicular to said operative surface, on overlapped work pieces between said operative surface of the welding element and said back-up means at each of said locations so that elastic vibratory energy is simultaneously introduced into the work pieces at said locations to there weld together the work pieces, and means operative to effect relative displacement in the direction of the desired seam weld of at least said back-up means and the work pieces to be welded so that the latter are successively subjected at said locations simultaneously to said clamping pressure and the consequent welding action along the desired seam.

6. An ultrasonic seam welding apparatus comprising a mechanical vibrator including magnetostrictive transducer means in which high frequency vibrations are generated and a welding element receiving said vibrations from said transducer means and having an operative surface of substantial length at which vibrations are produced at least parallel to the plane of said operative surface, non-rotatable mounting means supporting said vibrator, back-up means having surface elements thereof confronting said operative at least at a plurality of locations along the length of the latter and being there movable relative to the welding element generally in the direction of the length of said operative surface, means operative to displace said back-up means and welding element toward each other to exert a clamping pressure, in the direction perpendicular to said operative surface, on overlapped work pieces between said operative surface of the welding element and said back-up means at each of said locations so that elastic vibratory energy is simultaneously introduced into the work pieces at said locations to there weld together the work pieces, and feeding means operative to advance the overlapped work pieces between said operative surface and said back-up means in the direction of said length of the operative surface so that the work pieces are successively subjected at said locations simultaneously to said clamping pressure and the consequent welding action to form at least one seam parallel to the direction of advancement of the work pieces.

7. An ultrasonic seam welding apparatus as in claim 6; wherein said back-up means includes a plurality of rollers rotatable about axes extending transversely with respect to said length of the operative surface and arranged in a row parallel to said length so that the peripheries of said rollers, at the sides of the latter facing toward said operative surface, constitute said surface elements of the back-up means and the advanced work pieces pass successively between, and are subjected to said clamping pressure by said rollers in the row and said operative surface.

8. An ultrasonic seam welding apparatus as in claim 6; wherein said back-up means includes an endless flexible member, and means guiding said flexible member to move along a path having a run extending along said length of the operative surface so that said surface elements of the back-up means are constituted by the portions of the length of the flexible member successively disposed along said run to subject the overlapped work pieces to the clamping pressure along substantially the entire length of said operative surface of the welding element.

9. An ultrasonic seam welding apparatus comprising a mechanical vibrator including magnetostrictive transducer means in which high frequency compressive waves are generated and a welding element connected to said transducer means and having an operative surface at which said waves produce vibrations at least parallel to the plane of said operative surface, non-rotatable mounting means supporting said vibrator, rotatable back-up roller means having a peripheral surface confronting said operative surface of the welding element and formed with raised and depressed portions defining a pattern for a desired seam weld, means operative to displace said back-up roller means and welding element toward each other to exert a clamping pressure, in the direction perpendicular to said operative surface, on overlapped work pieces engaged between said operative surface of the welding element and said raised portions of the peripheral surface of said back-up roller means, so that elastic vibratory energy is introduced in the region of said clamping pressure to there weld together the engaged work pieces, and means operative to effect relative displacement in the direction of the desired seam weld of at least said back-up roller means and the work pieces to be welded so that the latter are successively subjected to said clamping pressure and welded along the desired seam in the pattern of said raised portions of the back-up roller means.

10. An ultrasonic seam welding apparatus comprising a mechanical vibrator including magnetostrictive transducer means in which high frequency vibrations are generated and a welding element receiving said vibrations from said transducer means and having an operative surface of substantial length at which vibrations are produced at least parallel to the plane of said operative surface, non-rotatable mounting means supporting said vibrator, back-up means having a movable surface confronting said operative surface of the welding element and being bodily displaceable along said length of the operative surface, means operative to displace said back-up means and welding element toward each other to exert a clamping pressure, in the direction perpendicular to said operative surface, on overlapped work pieces engaged between said surfaces of the welding element and back-up means, respectively, so that elastic vibratory energy is introduced in the region of said clamping pressure to there weld together the engaged work pieces, and means operative to displace said back-up means along said operative surface of the welding element, so that work pieces which are stationary with respect to said welding element are successively subjected to said clamping pressure and welded along the length of said operative surface.

11. An ultrasonic seam welding apparatus comprising a mechanical vibrator including magnetostrictive transducer means in which high frequency vibrations are generated and a welding element receiving said vibrations from said transducer means and having an operative surface of substantial length at which vibrations are produced at least parallel to the plane of said operative surface, non-rotatable mounting means supporting said vibrator, back-up means having an arcuate surface confronting said operative surface of the welding element and being bodily displaceable along said length of the operative surface of the welding element while said arcuate surface rolls relative to the latter, means operative to displace said back-up means and welding element toward each other to exert a clamping pressure, in the direction perpendicular to said operative surface, on overlapped work pieces engaged between said surfaces of the welding element and back-up means, respectively, so that elastic vibratory energy is introduced in the region of said clamping pressure to there weld together the engaged work pieces, and means operative to displace said back-up means along said operative surface of the welding element so that work pieces which are stationary with respect to said welding element are successively subjected to said clamping pressure and welded between the rolling arcuate surface and said operative surface.

12. An ultrasonic seam welding apparatus comprising a mechanical vibrator including magnetostrictive transducer means in which high frequency vibrations are generated and a welding element receiving said vibrations from said transducer means and having an operative surface of substantial length at which vibrations are produced at least parallel to the plane of said operative surface, non-rotatoble mounting means supporting said vibrator, back-up roller means mounted for rolling movement along said length of the operative surface, means operative to displace said back-up roller means and welding element toward each other to exert a clamping pressure, in the direction perpendicular to said operative surface, on overlapped work pieces engaged between said welding element and back-up roller means, so that elastic vibratory energy is introduced in the region of said clamping pressure to there weld together the engaged work pieces, and means operative to effect relative bodily displacement in the direction of said length of the operative surface between said back-up roller means and said welding element so that the work pieces are successively subjected to said clamping pressure and welded along the length of said operative surface.

13. An ultrasonic seam welding apparatus as in claim 12; wherein said means operative to effect the relative bodily displacement between the back-up roller means and the welding element includes motor means rotatably driving said back-up roller means.

14. An ultrasonic seam welding apparatus as in claim 12; wherein said back-up roller means is freely rotatable on a carrier movable along a path parallel to said length of the operative surface, and said means operative to effect the relative bodily displacement between the back-up roller means and the welding element includes drive means connected to said carrier to move the latter along said path.

15. An ultrasonic seam welding apparatus as in claim 12; further comprising means operative to displace said back-up roller means and welding element relative to each other in the direction of the axis of said roller means, so that the course of the seam along which the overlapped work pieces are welded is determined by the combination of the relative displacements of said roller means and welding element in said directions of the length of said operative surface and said axis, respectively.

16. An ultrasonic seam welding apparatus comprising a mechanical vibrator including a vibration transmitting member of substantial length having a welding element extending along one longitudinal edge thereof and defining a relatively long operative surface, and a plurality of devices introducing vibratory energy into said member at locations spaced apart along the opposite longitudinal edge of said member so as to effect vibrations at said surface at least in a plane parallel to the latter, non-rotatable mounting means supporting said vibrator, back-up means having a surface confronting said operative surface of the welding element and being movable relative to the latter generally in the direction of the length of said surface, means operative to displace said back-up means and welding element toward each other to exert a clamping pressure, in the direction perpendicular to said operative surface, on overlapped work pieces engaged between said surfaces of the welding elements and back-up means, respectively, so that elastic vibratory energy is introduced in the region of said clamping pressure to there weld together the engaged work pieces, and means operative to effect relative displacement in the direction of said length of the operative surface between at least said back-up means and the work pieces to be welded so that the latter are successively subjected to said clamping pressure and welded to form a seam in the direction of said length of the operative surface.

17. An ultrasonic seam welding apparatus as in claim 16; wherein said vibration transmitting member further has parallel slots extending therethrough at right angles to said longitudinal edges and disposed intermediate the locations of said devices introducing vibratory energy for breaking the Poisson couplings between the portions of said member at the opposite sides of each of said slots thereby ensuring that said vibrations are uniform and in-phase along the entire operative surface of said welding element.

18. An ultrasonic seam welding apparatus comprising a mechanical vibrator including a vibration transmitting member of substantial length having a welding element extending along one longitudinal edge thereof and defining a relatively long operative surface, and a plurality of devices introducing vibratory energy into said member at locations spaced apart along the opposite longitudinal edge of said member so as to effect vibrations at said surface at least in a plane parallel to the latter, nonrotatable mounting means supporting said vibrator, back-up means having a movable surface confronting said operative surface of the welding element and being bodily displaceable along said length of the operative surface, means operative to displace said back-up means and welding element toward each other to exert a clamping pressure, in the direction perpendicular to said operative surface, on overlapped work pieces engaged between said surfaces of the welding element and back-up means, respectively, so that elastic vibratory energy is introduced in the region of said clamping pressure to there weld together the engaged work pieces, and means operative to displace said back-up means along said operative surface of the welding element, so that work pieces which are stationary with respect to said welding element are successively subjected to said clamping pressure and welded along the length of said operative surface.

19. An ultrasonic seam welding apparatus comprising a mechanical vibrator including a vibration transmitting member of substantial length having a welding element extended along one longitudinal edge thereof and defining a relatively long operative surface, and a plurality of devices introducing vibratory energy into said member at locations spaced apart along the opposite longitudinal edge of said member so as to effect vibrations at said operative surface at least in a plane parallel to the latter, non-rotatable mounting means supporting said vibrator, back-up roller means mounted for rolling movement along said length of the operative surface of said welding element, means operative to displace said back-up roller means and welding element toward each other to exert a clamping pressure, in the direction perpendicular to said operative surface, on overlapped work pieces engaged between said welding element and back-up roller means, so that elastic vibratory energy is introduced in the region of said clamping pressure to there weld together the engaged work pieces, and means operative to effect relative bodily displacement in the direction of the length of said operative surface between said back-up roller means and said welding element so that the work pieces therebetween are successively subjected to said clamping pressure and welded along the length of said operative surface.

20. An ultrasonic seam welding apparatus comprising a mechanical vibrator including a vibration transmitting member of substantial length having a welding element extending along one longitudinal edge thereof and defining an operative surface of substantial length, and a plurality of devices introducing vibratory energy into said member at locations spaced apart along the opposite longitudinal edge of said member so as to effect vibrations at said surface at least in a plane parallel to the latter, non-rotatable mounting means supporting said vibrator, back-up means having surface elements thereof confronting said operative surface at least at a plurality of locations along the length of the latter and being there movable relative to the welding element generally in the direction of the length of said operative surface, means operative to displace said back-up means and welding element toward each other to exert a clamping pressure, in the direction perpendicular to said operative surface, on overlapped work pieces between said operative surface of the welding element and said back-up means at each of said locations, so that elastic vibratory energy is simultaneously introduced into the work pieces at said locations to there weld together the engaged work pieces, and feeding means operative to advance the overlapped work pieces between said operative surface and said back-up means in the direction of said length of the operative surface so that the work pieces are successively subjected at said locations simultaneously to said clamping pressure to form at least one seam parallel to the direction of advancement of the work pieces.

21. An ultrasonic seam welding apparatus as in claim 20; wherein said welding element is asymmetrical with respect to the median plane of said vibration transmitting member at the longitudinal edge of the latter at which said devices introduce vibratory energy so that the vibrations produced at said operative surface of the welding element also include components in directions perpendicular to said operative surface for diminishing the frictional resistance of said welding element to movement of the work piece between said back-up means and welding element.

22. An ultrasonic seam welding apparatus as in claim 20; wherein said back-up means includes a plurality of rollers rotatable about axes extending transversely with respect to said length of the operative surface and arranged in a row parallel to said length so that the peripheries of said rollers, at the sides of the latter facing toward said operative surface, constitute said surface elements of the back-up means and the advanced work pieces pass successively between, and are subjected to said clamping pressure by said rollers in the row and said operative surface.

23. An ultrasonic seam welding apparatus as in claim 20; wherein said back-up means includes an endless flexible member, and means guiding said flexible member to move along a path having a run extending along said length of the operative surface so that the portions of the length of said flexible member successively disposed along said run constitute said surface elements of the back-up means to subject the overlapped work pieces to the clamping pressure along substantially the entire length of said operative surface of the welding element.

References Cited in the file of this patent

UNITED STATES PATENTS

| | | |
|---|---|---|
| 1,728,812 | Tobey | Sept. 17, 1929 |
| 1,965,521 | Cutter | July 3, 1934 |
| 2,050,026 | Tarbox | Aug. 4, 1936 |
| 2,263,038 | Heim | Nov. 18, 1941 |
| 2,515,264 | Rasmusen | July 18, 1950 |
| 2,723,386 | Camp | Nov. 8, 1955 |
| 2,780,716 | Wasilisin | Feb. 5, 1957 |
| 2,874,470 | Richards | Feb. 24, 1959 |
| 2,880,404 | Harris | Mar. 31, 1959 |
| 2,946,119 | Jones | July 26, 1960 |
| 2,946,120 | Jones | July 26, 1960 |

FOREIGN PATENTS

| | | |
|---|---|---|
| 808,156 | Great Britain | Jan. 28, 1959 |